United States Patent Office 2,814,557
Patented Nov. 26, 1957

2,814,557

METHOD FOR PRODUCING TITANIUM CONCENTRATES THROUGH THE REDUCING SMELTING OF TITANIUM CONTAINING IRON ORES

Ferdinand Adrien Auguste Gregoire, Limonest, France, assignor to Societe des Blancs de Zinc de la Mediterranee, Eugene Chabaury, Pierre Gindre & Cie., Marseille, France, a company of France No Drawing. Application April 11, 1956, Serial No. 577,456

Claims priority, application France April 18, 1955

4 Claims. (Cl. 75—30)

The industrial methods resorted to for the production of pigments having as a base titanium dioxide rely chiefly on the attack of titanium-containing iron ores, such as ilmenite, because such ores are plentiful in the crust of the earth and are very cheap.

The conventional method consists in a direct attack of the ore through concentrated sulfuric acid, but the presence of a large amount of iron in such ores constitutes a considerable drawback since iron requires, for its solubilization, large amounts of sulfuric acid, and the crystallization of the iron sulfate obtained, which sulfate forms a by-product with no substantial value, is an intricate and difficult problem.

It is therefore of interest to obtain through a preliminary treatment of a titanium-carrying iron ore, a concentrate with large contents of titanium and with as little iron as possible so that it may then be attacked readily by means of concentrate sulfuric acid or, better still, by an alkaline product through the fritting method disclosed in the German Patents 517,043 and 517,044 both dated June 21, 1955.

Various methods have already been proposed for the preparation of a titanium concentrate starting from such titanium-carrying ores.

Generally speaking, the principle of such operations resides in a reducing smelting of the titanium-carrying ore at a high temperature. The separation between the iron and the titanium is provided by the formation of a melt of cast iron and of a slag forming two liquid phases.

The various known methods differ from one another through the proportions of incorporated reagents which act as a flux i. e. as foreign substances added to the charge so as to form a slag with the non-fusible components of the ore, and also through the temperature applied. The object sought for consists in obtaining a separation as marked as possible between the slag and the melt. The slag which is sufficiently fluid and the specific weight of which differs from that of the actual melt may be tapped off readily and be collected separately. It is thus possible to obtain a titanium concentrate containing very little iron. However although one of the methods resorted to may actually provide in certain particular cases worth-while results for an ilmenite of a well defined composition and consequently of a given origin or of a given batch, considerable difficulties and even failure are met if one attempts treating another batch or type of ilmenite through the same method. The slag separates with difficulty from the melt and there is a risk even of obtaining only a single phase because the conditions of temperature, the manner of controlling the heating, the amounts of carbonaceous material incorporated and acting as reducers, the type of flux, constitute many different factors which have a predominant influence in the production of the melt and of the slag. Even when these different factors are caused to vary within broad limits, the results obtained are not entirely satisfactory.

This may be explained if the considerable differences in the composition of the ilmenites of different origins are considered. These differences appear in the contents of $TiO_2$, and chiefly in the iron contents. The latter appears generally in the form of two oxides FeO and $Fe_2O_3$ and the respective proportions of these two oxides are very variable.

Diagrammatically, it is possible to give ilmenite ore the following formula:

$$xTiO_2, yFeO, zFe_2O_3$$

To give a more accurate idea, a few ilmenites are analyzed in the following table:

| Origin of the ilmenite | Norway | Senegal | Malaya | Arcachon | Australia |
|---|---|---|---|---|---|
| $TiO_2$ | 43.4 | 53.2 | 54.22 | 30.1 | 48.18 |
| FeO | 35.2 | 14.9 | 24.00 | 26.0 | 28.90 |
| $Fe_2O_3$ | 13.2 | 30.0 | 15.42 | 38.6 | 16.43 |
| Impurities | 6.31 | 1.82 | 6.35 | 4.56 | 6.48 |

The impurities consist of the following oxides in highly variable amounts $SiO_2$, $MnO_2$, $Cr_2O_3$, $Al_2O_3$, MgO, $V_2O_5$, etc.

The production of the cast iron melt, i. e. the reduction of iron oxides through carbonaceous material and then the carbonization of the iron depend inter alia on the speed of reduction of the iron oxides.

These oxides, FeO, and $Fe_2O_3$, are more or less rigidly bound to the $TiO_2$ in the ore and the reduction of the FeO by the carbon may be performed even before all the $Fe_2O_3$ has been reduced into FeO by the said carbon.

The chief following reactions are to be considered:

$$FeO + C \rightarrow Fe + CO$$
$$Fe_2O_3 + 3C \rightarrow 2Fe + 3CO$$
$$3Fe + C \rightarrow Fe_3C$$

Secondary reactions may also be produced and a heterogeneous system is thus obtained.

Various chemical and physical phenomena interfere with these reactions and the different reactions may be produced simultaneously, chiefly if the speed of heating is too considerable. The reduction of the iron oxide may not be finished when the carbonization of the iron obtained through the reduction of the oxides has already begun and similarly, the titanium-containing slag may be subjected to an initiating reduction which leads to a thickening of the slag. Consequently, and in order to prevent to a certain extent any interference between these various phenomena, certain authors advocate:

(1) A slow heating speed because a high speed would risk reducing the titanium oxide before the reduction of the iron oxide is at an end.

(2) The amount of carbon should provide only for the reduction of the iron oxide and also for its carbonization, an excess of carbon producing a reduction of the titanium-carrying slag.

It is thus apparent that in all cases the reduction through carbon of the iron oxides present in the ilmenite is a difficult matter by reason of the complexity of the equilibrium between the different components in the liquid and the solid phases obtained and the result reached on an industrial scale are unreliable. However, this reducing step is of primary importance and it is necessary to remember that it is only through the formation of a melt that the separation of the slag may be ensured, and this operation is very difficult to bring to completion.

The present invention has for its object, starting from any type of ilmenite, to obtain within a mixture the following successive operative steps, precisely in the following sequence.

(1) Reduction of the iron oxide $Fe_2O_3$ present in the ilmenite into FeO.

(2) Reduction of the iron oxide FeO originally present in the ilmenite together with that obtained through the preceding reduction into metallic iron.

(3) Carbonization of the iron obtained and formation of the cast-iron melt, and then, complete separation between the melt and the titanium-carrying slag.

Thus, the reactions follow one another and they do not risk thereby interfering with one another and thereby disturbing the equilibrium between the solid and liquid phases of the components. The successive equilibrias follow each other in the different steps.

The invention is thus characterized by a selective reduction of the iron oxides, the higher oxide $Fe_2O_3$ being first reduced to form the lower oxide FeO after which the latter is reduced into metallic iron.

These selective successive reactions are obtained in the manner described hereinafter:

A. It is apparent that it is necessary to resort to different reducing agents and first to operate with a reducing agent acting only on the higher oxide i. e. $Fe_2O_3$ to the exclusion of ferrous oxide FeO.

Now, it is a well-known fact that pulverulent iron reduces the iron oxide $Fe_2O_3$ at a high temperature ranging between 900 and 1000° C. in accordance with the reaction $$Fe_2O_3 + Fe \rightarrow 3FeO$$

according to the principle of the refining of a metal oxide through the corresponding metal. This reaction is performed rapidly and at a comparatively low temperature.

Thus, it is sufficient with a view to ensuring the first reaction to incorporate into the finely crushed ilmenite the stoichiometric amount of pulverulent iron required for the reduction of the $Fe_2O_3$ contained in the ilmenite ore into FeO.

For instance one hundred parts by weight of Norwegian ilmenite containing 13.2% of $Fe_2O_3$ required 4.620 parts of pulverulent iron whereas 100 parts of ilmenite from Senegal containing 30% of $Fe_2O_3$ require 10.5 parts of pulverulent iron for this reduction.

B. This being performed, a carbonaceous material such as graphite, coal, coke or the like, is used as a reducing agent with a view to reducing the total contents of FeO, whether originally in the ore or obtained through the preceding reduction, into metallic iron in accordance with the reaction.

$$FeO + C \rightarrow Fe + CO$$

This reaction is well known in the art and it is sufficient to raise a mixture of carbon and iron oxide FeO to a suitable temperature ranging between about 1,100 and 1150° C. so as to cut out any secondary reaction between carbon monoxide and carbon and to obtain metallic iron with a release of carbon monoxide.

C. The metallic iron thus obtained is then combined with the carbon so as to form cast-iron in accordance with the reaction.

$$3Fe + C \rightarrow Fe_3C$$

This last reaction is also well known in the art and it is a known fact that at the temperature of 1145° C. there is produced an eutectic containing 4.2% of carbon and 95.8% of iron.

The combination of 4.2% of carbon with the iron lowers the melting point of the latter and there is obtained at about 1150/1200° C. a liquid melt of cast-iron.

Thus, the first step "A" is performed rapidly and completely at a temperature ranging between 900 and 1000° C.

The step "B" is performed at a temperature equal to or above 1100° C.

As to the operation "C," it is performed at a temperature of about 1150° C.

The amount of the second reducing agent, i. e. the carbonaceous material (graphite, charcoal, coal, coke or the like) should be carefully calculated so as to be exactly that required for the execution of the Reactions 2 and 3.

Thus, for instance, for treating 100 parts by weight of Norwegian ilmenite having the following composition:

| | Percent |
|---|---|
| $TiO_2$ | 43.4 |
| FeO | 35.2 |
| $Fe_2O_3$ | 13.2 |

A. 4.620 parts of pulverulent iron by weight are required for transforming the 13.200 parts of $Fe_2O_3$ into FeO so as to obtain 17.82 parts of FeO.

B. There are thus obtained altogether 53.020 parts of FeO corresponding to the 35.20 parts contained in the original ilmenite and to the 17.82 parts obtained through reduction, and this FeO requires for its reduction into metallic iron in accordance with Reaction 3 8.840 parts of carbon.

C. This last reaction requires 2.950 further parts of carbon for the formation of the melt of cast-iron.

Thus, the total amount required for the complete reduction of the iron oxides present in 100 parts of Norwegian ilmenite into a liquid melt requires:

4.620 parts of pulverulent iron
11.790 parts of coal (8.840+2.950)

This example is not given in a limiting sense and it is possible to calculate similarly the amounts of reducing agents (pulverulent iron and coal) which are required for the treatment of any other ilmenite in accordance with the above-described method.

Said method is also applicable with favorable results to titanium-containing iron ore such as iron oxides with very low contents of $TiO_2$ e. g. titanium-containing sands of South American (Argentina), Japanese ilmenites and also the residual products obtained in the treatment of bauxites (red muds).

Having thus defined for any given ilmenite the amount of the reducing agent to be used, it is now necessary to examine the formation of the titanium-containing slag.

It is necessary for the slag to be sufficiently fluid so as to separate readily from the melt. Temperature is thus the predominant factor for said operation and it governs the selection of the fluxes which are to form the slag with the $TiO_2$. The melting point of the slag should not be too high and it should be in principle lower than 1,150° C. so that the slag may be suitably collected.

Numerous fluxes have been proposed and it is certain that, by resorting to the above disclosed method of a selected reduction of the iron oxides, excellent results may be obtained.

According to the invention, the formation of the titanium-containing slag is ensured through that combination of $TiO_2$ with $Na_2O$, the melting point of which is the lowest. The diagrams of equilibrium between liquid and solid phases are known for various binary systems comprising the oxide $TiO_2$. It has been found inter alia that the compound $3TiO_2, NaO_2$ has a melting point of 1,128° C.

Sodium carbonate for instance may act advantageously as a flux. The amounts of $CO_3Na_2$ to be used are the stoichiometric amounts required for forming, with the $TiO_2$ contained in the ilmenite considered, the compound $3TiO_2NaO_2$. It is however of advantage to use an amount of said carbonate higher by about 5% than the stoichiometric amount whereby the impurities present in the ore are transformed into sodium salts.

By way of example and in an non limiting sense, it has been possible to produce a titanium concentrate starting from 100 parts by weight of ilmenite from Malaya, the composition of which was as follows:

54.22% $TiO_2$
24.00% FeO
15.42% $Fe_2O_3$
6.35% of various impurities

This ilmenite has been crushed finely so as to pass through a 250/300 mesh and in accordance with the procedure described here-above, it has been possible to define the amount of reducing agents (pulverulent iron and carbon) required for the selective reduction of the two iron oxides, i. e. in the case considered 5.4 parts by weight of pulverulent iron and 9.8 parts of carbon.

The amount of sodium carbonate required for forming the compound $3TiO_2, Na_2O$ with the $TiO_2$ contained in the ilmenite is equal to 25 parts of $CO_3Na_2$.

According to my invention, these various components (ilmenite, pulverulent iron, carbon and soda carbonate) are intimately commingled and the mixture is poured into a rotary melting furnace. Any other suitable apparatus such as a stationary furnace, a smelting furnace etc., may be used as well.

The mixture is raised within 30 minutes to a temperature of about 1,000° C. Thus duration of reaction is sufficient for bringing the operative step "A" to completion, after which the temperature is raised to 1150 to 1250° C. and held at about 1250° C. during about 30 minutes so as to obtain a perfectly fluid mass.

The cast iron melt collects at the bottom of the furnace and the titanium-containing slag which is perfectly separate from the cast iron extends over the latter so that it may then be poured carefully into a water-filled container, and when the cast iron appears to view, it is poured into suitable molds or poured into a further water-filled container.

The titanium-containing slag crumbles easily and, when dry, it may be easily crushed. This slag has the following composition:

73% of $TiO_2$
0.8% of iron (expressed as $Fe_2O_3$)

The slag is then subjected to the action of a hot solution of sulfuric acid containing about 10% of monohydrate $SO_4H_2$ and then after to a final washing with water and to a kiln-drying so as to obtain a titanium concentrate having the following composition:

95.4% of $TiO_2$
4.2% of various impurities constituted chiefly by $SiO_2$

The slag thus obtained may readily be treated as it is in accordance with the methods disclosed in the above mentioned prior German patents.

Obviously, the same result may be reached by treating first the ilmenite alone at 900/1000° C. with pulverulent iron, the amounts of which are calculated so as to transform all the $Fe_2O_3$ into FeO after which the carbon and the flux are incorporated and the temperature is raised to 1150/1250° C.

What I claim is:

1. A method for producing titanium concentrates, starting from titanium-containing iron ores containing both ferrous and ferric oxides, consisting in the steps of adding thereto metallic iron and then reducing first and substantially exclusively, the ferric oxide into ferrous oxide, at a temperature between about 900° C. and 1100° C., adding carbon and increasing the temperature to about 1100° to 1150°, so as to reduce to metallic iron both the originally contained ferrous oxide and the ferrous oxide formed by the first reduction step, and finally carbonizing the iron obtained in the presence of a flux whereby to obtain a cast iron melt and a titanium-containing slag and then tapping off said slag.

2. A method for producing titanium concentrates starting from titanium-containing iron ores containing ferrous and ferric oxides, consisting in admixing the iron ore with pulverulent iron the proportion of which is calculated in accordance with the contents of ferric oxide in the ore, subjecting the mixture to a temperature ranging between about 900 and 1000° C. to reduce completely the ferric oxide into ferrous oxide, raising the temperature to 1100° C. in the presence of a carbonaceous substance in amounts corresponding substantially to the amount of oxidized iron in the ore to obtain the reduction into metallic iron of all the ferrous oxide, both the original ferrous oxide contained in the ore and the ferrous oxide obtained through the preceding reduction, and then still further raising the temperature up to about 1150 to 1200° C. in the presence of a carbonaceous substance and of a flux to carbonize the metallic iron to obtain a cast iron melt and a titanium-containing slag.

3. A method for producing titanium concentrates starting from titanium-containing iron ores containing ferrous and ferric oxides, consisting in admixing the iron ore with pulverulent iron the proportion of which is calculated in accordance with the contents of ferric oxide in the ore, subjecting the mixture to a temperature ranging between about 900 and 1000° C. to reduce completely the ferric oxide into ferrous oxide, raising the temperature to 1100° C. in the presence of a carbonaceous substance in amounts corresponding substantially to the amount of oxidized iron in the ore to obtain the reduction into metallic iron of all the ferrous oxide, both the original ferrous oxide contained in the ore and the ferrous oxide obtained through the preceding reduction, and then still further raising the temperature up to about 1150 to 1200° C. in the presence of a carbonaceous substance and of a flux constituted by an amount of soda carbonate the proportion of which will form with the titanium oxide $TiO_2$ in the ore undergoing treatment the compound $$3TiO_2Na_2O$$

to carbonize the metallic iron to obtain a cast iron melt and a titanium-containing slag.

4. Method of preparing titanium concentrates from titaniferous ores containing both ferrous and ferric iron, comprising the steps of reducing, at about 900° C., by means of metallic iron, substantially all the ferric oixide, to a ferrous oxide, then raising the temperature to about 1100 to 1150° and at this elevated temperature reducing, by means of carbon, all ferrous oxide, both original and that arising from the first reduction, to metallic iron, and simultaneously, by using an excess of carbon, forming a melt of cast iron and a slag rich in titanic oxide and substantially free from iron, and separating said melt and said slag.

References Cited in the file of this patent
UNITED STATES PATENTS 2,238,673    Asak    Apr. 15, 1941
2,375,268    Wycokoff    May 8, 1945